United States Patent [19]

Bartelme

[11] 4,098,018
[45] Jul. 4, 1978

[54] INSECT TRAP ATTACHABLE TO A TREE
[75] Inventor: Jack H. Bartelme, Rhinelander, Wis.
[73] Assignee: The Raymond Lee Organization, Inc., New York, N.Y. ; a part interest
[21] Appl. No.: 710,229
[22] Filed: Jul. 30, 1976
[51] Int. Cl.² .............................................. A01M 1/18
[52] U.S. Cl. ................................................... 43/108
[58] Field of Search ....................... 43/108, 131; 47/23
[56] References Cited
U.S. PATENT DOCUMENTS

| 1,415,134 | 5/1922 | Williams | 43/108 |
| 1,954,795 | 4/1934 | Bernitz, Sr. | 43/108 |
| 2,240,766 | 5/1941 | Elder | 43/108 |

Primary Examiner—Louis G. Mancene
Assistant Examiner—Robert P. Swiatek
Attorney, Agent, or Firm—Howard I. Podell

[57] ABSTRACT

A trap of conic section attached along an upper edge by a spring around the tree trunk can be closed around the tree trunk by a zipper attached along a vertical side of the trap to the trap, the trap forms a trough along an inner edge of the bottom of the trap into which an insecticide may be dripped by a tube passing through the side of the trap and connected to a canister which is also attached to the trap in which the insecticide may be stored and from which the insecticide may drip into the trough.

4 Claims, 3 Drawing Figures

INSECT TRAP ATTACHABLE TO A TREE

I have invented a new and novel insect trap attachable to a tree. My insect trap can be readily attached around the trunk of a tree and may catch insects that might climb the tree by causing the insect to walk through an insecticide which may be kept in an inward cup of the trap protected by the outer surface of the conical section trap. By means of a zipper and the spring attached to the upper edge of the trap the trap may be attached and removed rapidly from a tree.

My invention can be understood in view of the accompanying figures.

Figure 1:
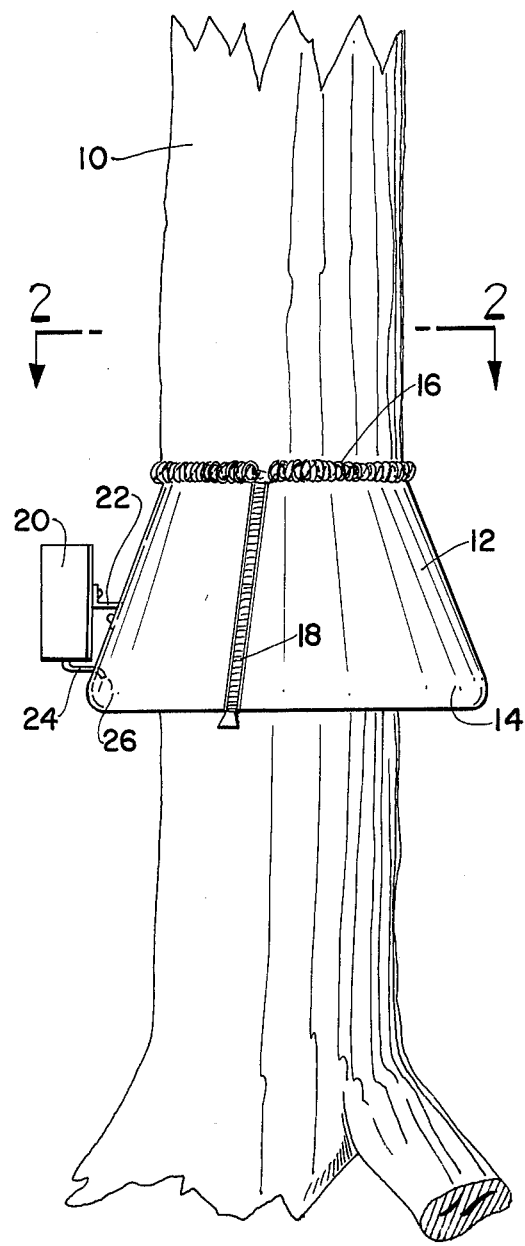
FIG. 1 is a view of the trap attached to a tree.
Figure 2:
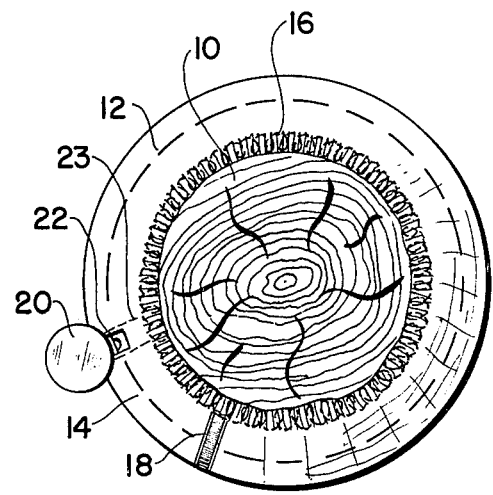
FIG. 2 is a view of the trap shown in FIG. 1 taken in the plane 2—2 of FIG. 1.
Figure 3:
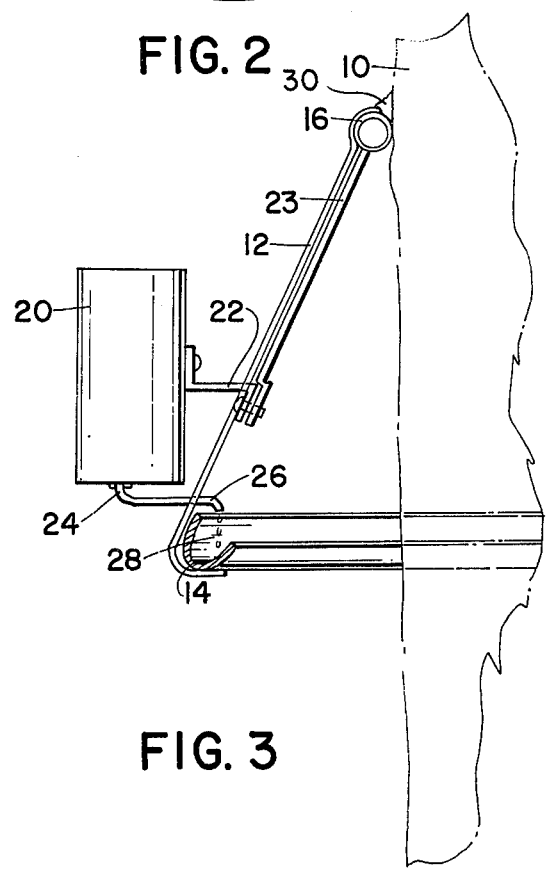
FIG. 3 is a vertical cross section of the trap showing the connection between the insecticide canister and the cup which holds the insecticide.

With regard to FIGS. 1, 2, and 3, on a tree 10 a conic section insecticide trap 12 may be attached. The insect trap 12 may form an inner lip 14 along the lower edge of the trap 12 and a spring 16 attached along an upper edge of the trap 12 may hold the trap 12 against the circumference of the tree 10 when a zipper 18 closes the trap 12 around the circumference of the tree 10. A canister 20 for storing insecticide is connected by a brace 22 passing through the trap 12 and is secured to a vertical brace 23 which in turn is attached to the spring 16. A narrow gauge delivery tube 24 connected to the base of the canister 20 carries the insecticide through the trap 12 where a downward bent tip 26 delivers droplets of the insecticide 28 to the interior of the trough 14 formed inside the trap 12 where the insecticide may be contacted by insects attempting to walk up the trunk of the tree 10 and by that contact the insects may be killed.

By extending the tip 26 to approximately a quarter inch of the bottom of trough 14, the insecticide will refill the trough 14 automatically when the level goes below the tip 26.

A filler 30, such as putty, is applied to the upper edge of the spring 16 to prevent insects from going under the trap and up the tree.

This trap may be made in several sizes for several tree sizes.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:

1. An insect trap attachable to a tree, comprising: an insect trap of conic section,
   means of resiliently constraining an upper edge of the trap against a circumference of the tree,
   a lower edge of the trap extended inwardly to form a trough,
   an upper edge of the trap resiliently held against the trunk of the tree by a spring,
   a zipper attached along a vertical section of the trap to the trap to form a means of removably attaching the trap to the trunk of the tree,
   a cannister attached to an external surface of the trap and connected by a tube passing through the trap to the trap to deliver an insecticide to the trough,
   a bracket attached to the cannister and passing through a side of the trap,
   a vertical bracket attached to a distal end of the bracket and extended upward and attached to the spring, and
   a distal end of the tube forming a downward bend extending over the trough, whereby a droplet of the insecticide may be delivered into the trough.

2. The trap of claim 1, wherein the distal end of the tube extends down into the trough to deliver the insecticide into the trough and up to the level of the distal end of the tube.

3. The trap of claim 2, further comprising a filler attached to and around an upper edge of the spring whereby an insect is prevented from climbing under the spring.

4. The trap of claim 3, wherein the filler is putty.

* * * * *